United States Patent [19]

Pike et al.

[11] Patent Number: 4,475,570

[45] Date of Patent: Oct. 9, 1984

[54] ANTI-SYPHON FREEZELESS WATER HYDRANT

[75] Inventors: Daniel W. Pike, Mission; Phillip J. Crawley, Overland Park; John L. Marshall, Lenexa, all of Kans.; Steve A. Martin, Grandview, Mo.

[73] Assignee: Prier Brass Manufacturing Co., Kansas City, Mo.

[21] Appl. No.: 312,139

[22] Filed: Oct. 16, 1981

[51] Int. Cl.³ .......................................... F16K 24/02
[52] U.S. Cl. ................................. 137/218; 137/360; 137/625.26; 137/801
[58] Field of Search ............... 137/218, 360, 625.26, 137/801

[56] References Cited

U.S. PATENT DOCUMENTS

| | | | |
|---|---|---|---|
| 2,810,395 | 10/1957 | Simmons | 137/360 |
| 2,952,270 | 9/1960 | Fulton et al. | |
| 3,106,935 | 10/1963 | Gatzke | |
| 3,424,189 | 1/1969 | Woodford | |
| 3,459,443 | 8/1969 | Butters et al. | 137/218 X |
| 3,929,150 | 12/1975 | Flinner et al. | |
| 3,952,770 | 4/1976 | Botnick | |
| 4,316,481 | 2/1982 | Fillman | 137/302 |

Primary Examiner—Gerald A. Michalsky
Attorney, Agent, or Firm—Schmidt, Johnson, Hovey & Williams

[57] ABSTRACT

A water hydrant is provided with a number of valves operable to eliminate freezing problems and to prevent backflow into potable water, thereby precluding the danger of contamination. Water and air valves operate in conjunction such that trapping of water in the hydrant is averted by the admission of air after each closing of the water valve. By a somewhat different arrangement in outlet spout valving, air is also admitted to the spout after each closing of the water valve or other reduction in water pressure, the spout valving having the additional feature of blocking backflow, all of which meets the anti-contamination requirements of the hydrant.

18 Claims, 14 Drawing Figures

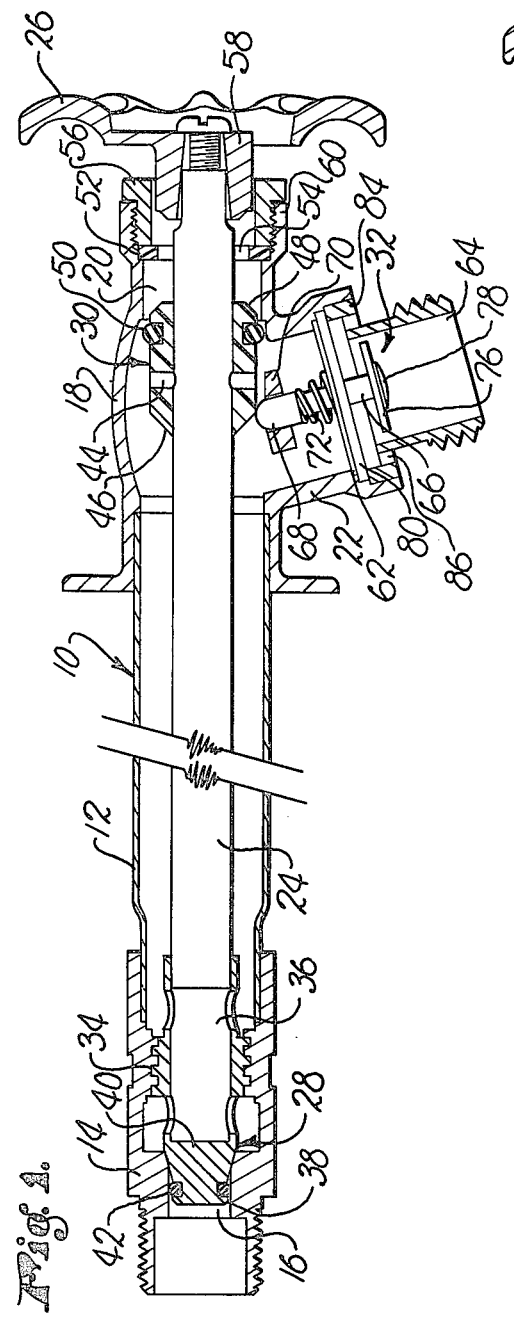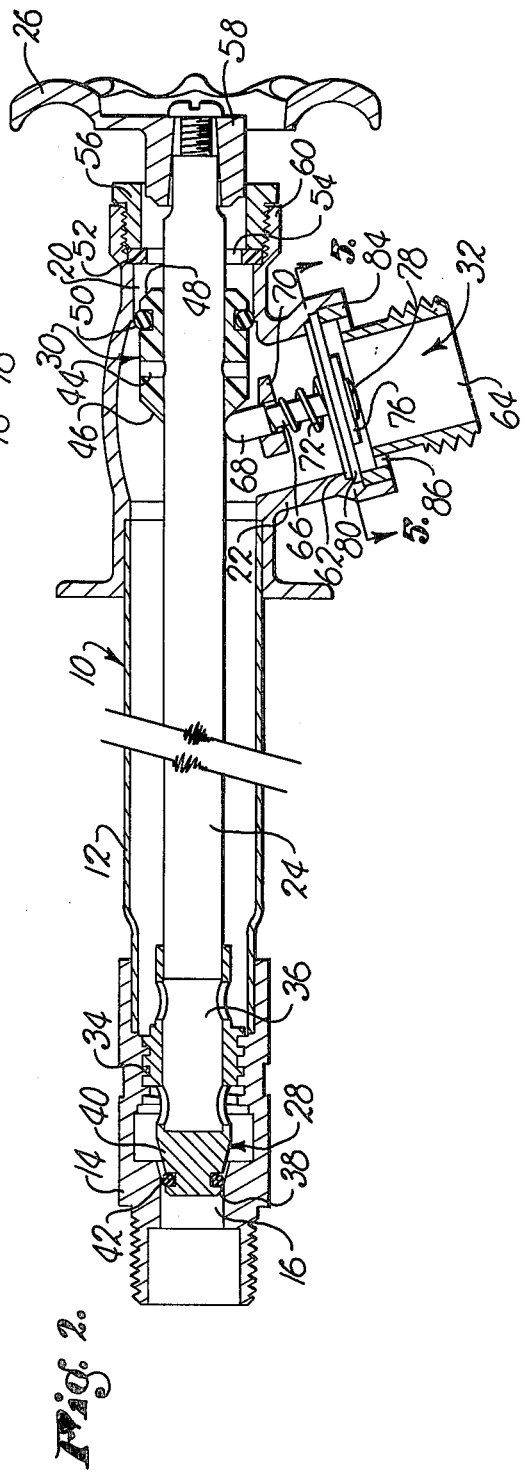

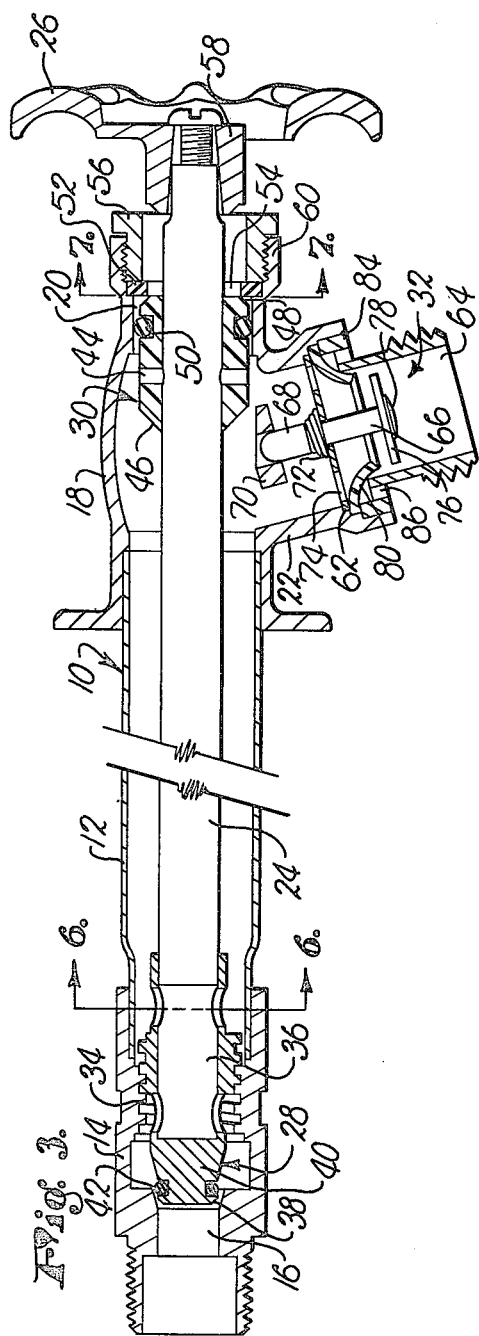
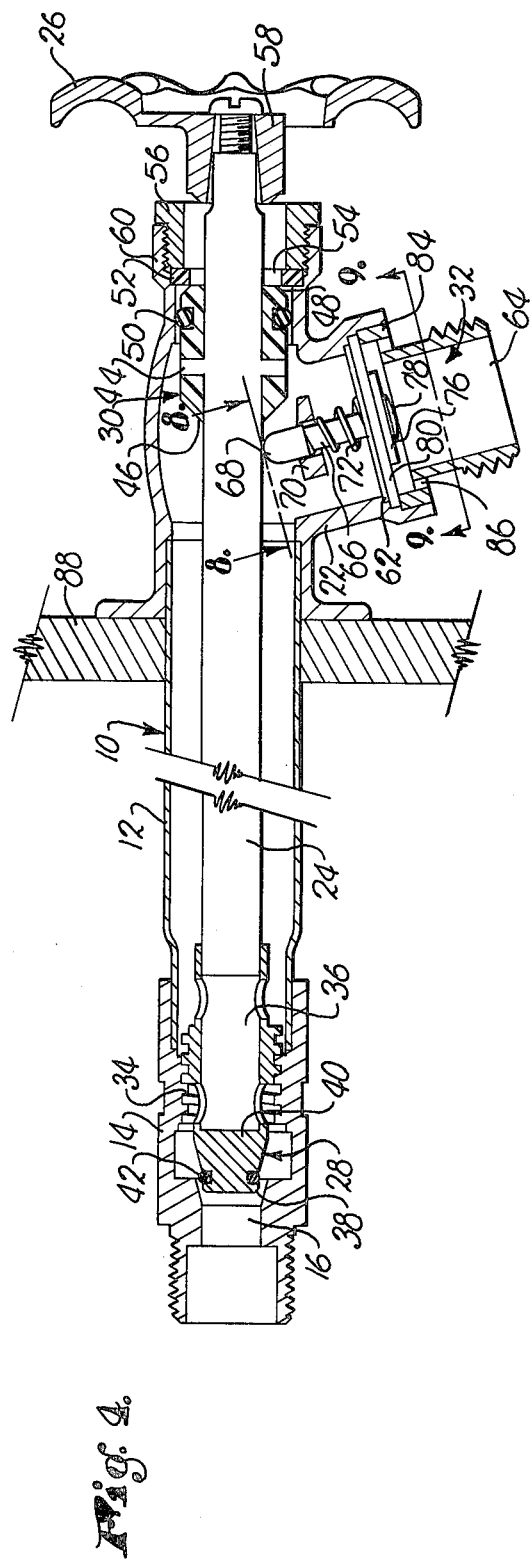

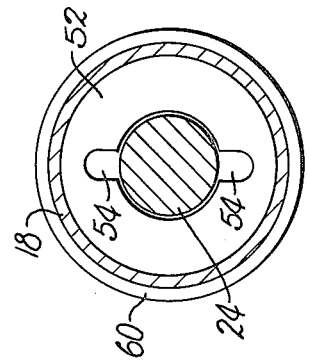
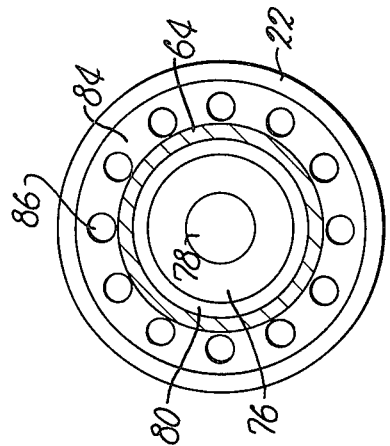
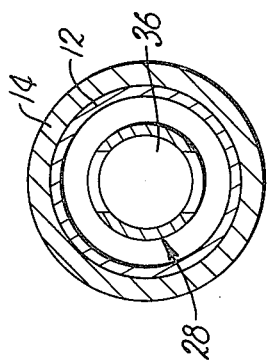
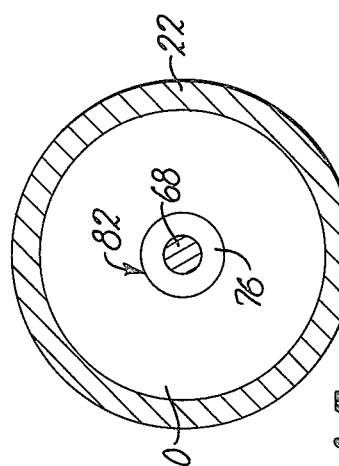
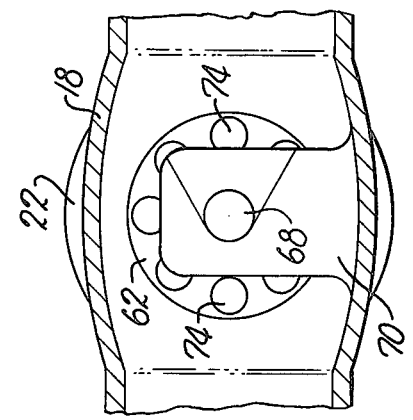

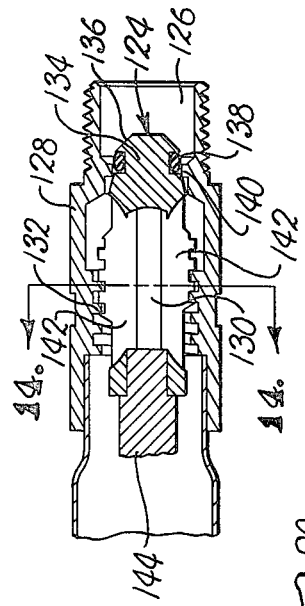
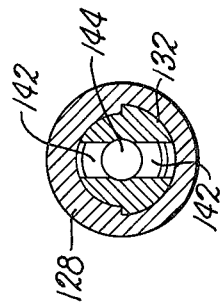
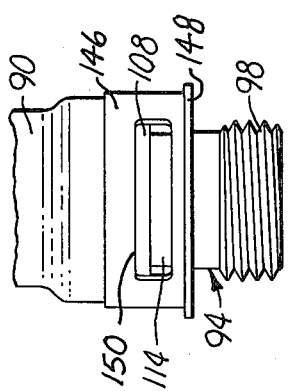
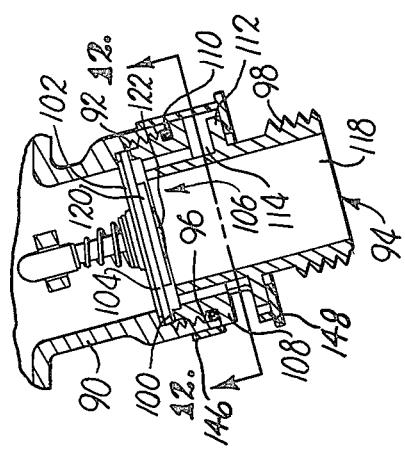
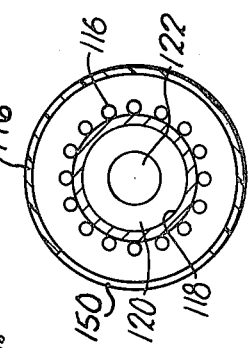

ANTI-SYPHON FREEZELESS WATER HYDRANT

Water hydrants of the kind which extend through outside walls of buildings are normally provided with an external hand wheel for turning a valve stem that reciprocates within an elongated tube by virtue of the provision of internal screw threads. The internal end of the tube is connected with a source of potable water under pressure and a water shut-off valve at the inner end of the stem remote from the wall is usually provided with a replaceable washer which engages a seat when the valve is closed.

Oftentimes, water becomes trapped and freezes within the hydrant after closing of the water valve, the common result of which is costly repair or replacement. Moreover, under certain conditions there is the danger of contamination of water upstream of the hydrant because of backflow, a drawback which violates most local codes.

In accordance with the present invention all of the most aggravating hydrant problems are effectively solved, including proper drainage of the hydrant after each use to avoid freezing, and effective blockage of reverse flow into the hydrant, whatever the conditions which might otherwise cause a likelihood of contamination.

Hydrant drainage is assured by the provision of a stem-controlled air valve operable to admit air automatically as the water valve is closed, thereby causing water within the hydrant to freely drain through its outlet spout. When the water valve is opened the air valve closes to not only preclude air inflow but to block leakage of water outwardly past the air valve.

In one embodiment the water valve is provided with a tapered plug and seat closure characterized by the fact that mating interengagement improves during use. Both the water valve and the air valve have circumscribing seals movable into fluid tight relationship to corresponding bores.

Additional valving is provided within the spout operable in part by stem movement during turning of the hand wheel and in part by pressure differentials. Unique camming during stem reciprocation overcomes the bias of a spring in the spout valving, such camming being advantageously provided on the air valve.

A perforate diaphragm, backed by a perforate plate, and responsive to the pressure of water flowing to the spout, operates to close orifices which normally place a spigot portion of the spout in communication with the atmosphere. A pressure drop upstream of the diaphragm, whether caused by closing of the water valve or otherwise, results in opening of the orifices and the blocking of reverse water flow from the spout toward the water valve. All operations are the same whether or not a hose is coupled with the hydrant and whether or not the hose has a closed discharge nozzle.

In one modification of the instant invention drainage water is directed away from the operator of the hand wheel by the provision of a rotatable sleeve on the water outlet spout.

A related application assigned to the Assignee of the instant application, Ser. No. 895,794 entitled "Freezeless Water Hydrant", filed Apr. 12, 1978 in the name of Philip J. Crawley, was abandoned on or about Sept. 14, 1979.

In the drawings:

FIG. 1 is a longitudinal cross sectional view through an anti-syphon freezeless water hydrant made according to one embodiment of the present invention showing the water inlet valve closed;

FIG. 2 is a view similar to FIG. 1 showing the air valve closed;

FIG. 3 is a view similar to FIG. 1 showing the water inlet valve open and the air valve closed;

FIG. 4 is a view similar to FIG. 1 showing the water inlet valve open with the remaining valves all closed;

FIG. 5 is a cross sectional view taken on line 5—5 of FIG. 2;

FIGS. 6 and 7 are cross sectional views taken on lines 6—6 and 7—7 of FIG. 3;

FIGS. 8 and 9 are cross sectional views taken on lines 8—8 and 9—9 respectively of FIG. 4;

FIG. 10 is a fragmentary view similar to FIGS. 1-4 showing a modified construction at the water outlet spout of the hydrant;

FIG. 11 is a fragmentary view similar to FIGS. 1-4 showing a modified construction at the water valve of the hydrant;

FIG. 12 is a cross sectional view taken on line 12—12 of FIG. 10;

FIG. 13 is a fragmentary elevational view of the outlet spout shown in FIG. 10; and FIG. 14 is a cross sectional view taken on line 14—14 of FIG. 11.

A water hydrant, broadly designated by the numeral 10 in the drawings, has an elongated tube 12 provided with an inner housing 14 having a cylindrical water inlet bore 16, an outer housing 18 have a cylindrical air inlet bore 20 and a laterally extending water outlet spout 22 disposed inwardly of the bore 20, and a rotatable stem 24 reciprocable in the tube 12, terminating in an exterior operating member such as a hand wheel 26 releasably attached to the stem 24.

A water valve 28 is connected to the stem 24 in the housing 14 for controlling the flow of water from the bore 16 to the tube 12; an air valve 30 is connected to the stem 24 in the housing 18 for controlling the inflow of air and precluding outflow of water through the bore 20; and a check valve 32 is provided in the spout 22 having, among its several functions, preclusion of backflow of water into the housing 18.

Intermeshing screw threads 34 are provided between the valve 28 and the housing 14 and the valve 28 has a water passage 36 by-passing the threads 34. The bore 16 terminates in a combination stop and valve seat 38 within the housing 14, the annular, beveled seat 38 facing inwardly toward the valve 28. The valve 28 has a frusto-conical plug 40 shaped complementally with the conical configuration of the seat 38, and a seal in the nature of an O-ring 42 is carried by the plug 40 in surrounding relationship thereto adjacent its free end.

The valve 30, in the nature of a boss surrounding and connected to the stem 24 by a cross pin 44, has opposed, annular, beveled ends 46 and 48, there being a seal in the nature of an O-ring 50 carried by the valve 30 in surrounding relationship thereto adjacent its end 48.

A combination stop and stem-centering, guide washer 52 surrounding the stem 24 is provided with a pair of diametrically opposed air inlet slots or ports 54, and is clamped in place within the housing 18 by a tubular, externally threaded, lockshield nut 56 surrounding the stem 24, adapted to receive a hub 58 on the wheel 26, and received within a tapped neck 60 of the housing 18.

The tamper proof valve 32 included a flat, circular relatively rigid, centrally perforated, metal plate 62 clamped across the spout 22 inwardly of an externally threaded spigot 64 forming the outer terminus of the spout 22. A stem 66, reciprocable along the axis of the spout 22, has a button 68 in a guide 70 integral with the spout 22, the stem 66 being guided also by the plate 62 through which it projects. A conical spring 72 is coiled about the stem 66 between the plate 62 and the button 68, and a circular row of round holes 74 in the plate 62 surrounds the stem 66. A circular, flexible disc 76 of rubber or the like surrounds the stem 66 below the plate 62 and is held in place by a head 78 on the stem 66.

A circular, flexible diaphragm 80, also of rubber or the like, underlies the plate 62 and has a central opening 82, of smaller diameter than that of the disc 76, and disposed in surrounding relationship to the stem 66 above the disc 76.

The spigot 64 has an external, L-shaped flange 84 provided with a row of orifices 86 surrounding the spigot 64 below the diaphragm 80 and open to the atmosphere. The flange 84 is fitted tightly into the spout 22, clamping the peripheral margins of the plate 62 and the diaphragm 80 in place.

OPERATION

The hydrant 10 is installed by attachment of the housing 18 to the outer face of a wall 88 (FIG. 4) through which the tube 12 projects, and the housing 14 is then connected with a source of potable water under pressure. The valve 28 is closed by turning the wheel 26 (FIG. 1) until further inward movement of the stem 24 is precluded by the plug 40 abutting the seat 38. Water flow is stopped as soon as the O-ring 42 moves past the seat 38 into water tight relation to the bore 16, whereupon safety shut-off is established as soon as the plug 40 mates with the seat 38.

The rotating O-ring 42 wipes the surface which defines the bore 16 during each inward and outward movement along the bore 16, cleaning away encrustations, corrosive elements and other foreign matter. This also avoids formation of flats and discrete areas of wear on the O-ring 42 such that it becomes long lasting. The same wiping action takes place between the plug 40 and the seat 38 with the same good results. Additionally, metal imperfections are ultimately removed such as to establish a perfect, water tight fit between the plug 40 and the seat 38.

At the same time (FIG. 1) the valve 30 will move inwardly, causing the bevel 46 to cam the button 68, and therefore, the stem 66 and the disc 76 downwardly against the action of the spring 72, clearing the opening 82. Simultaneously, the O-ring 50 moves out of the bore 20 to permit free fluid flow through the latter.

Therefore, since air is free to enter through the ports 54, water which might otherwise be trapped in the tube 12 and the housings 14 and 18 will drain freely to the spout 22 for exit through the spigot 64, seeping past the central perforation and the holes 74 of the plate 62, as well as the opening 82. The bevel 48 affords adequate inflow of air from the bore 20.

In the event a hose is attached to the spigot 64, water therein above the level of the orifices 86 will drain through the latter whether or not there is a closed nozzle on the hose because the orifices 86 are open to the atmosphere.

Here again, the O-ring 50 has long lasting characteristics for the same reasons as above explained, operating in the bore 20 precisely as the O-ring 42 is related to the bore 16.

During initial outward movement of the stem 24 (FIG. 2), unseating the plug 40, but with the O-ring 42 still closed in the bore 38, the O-ring 50 moves into the bore 20 to not only preclude entry of air into the bore 20 via the ports 54, but to preclude flow of water from the housing 18 past the O-ring 50. At the same time, the bevel 46 shifts to a position which permits the spring 72 to cause the disc 76 to snap against the diaphragm 80, clamping it against the plate 62 to close the holes 74 and the opening 82.

Referring now to FIG. 3 of the drawings, when the wheel 26 is turned to draw the O-ring 50 along the bore 20 until the valve 30 abuts the washer 52, the O-ring 42 moves out of the bore 16 such that water from the bore 16 flows between the seat 38 and the O-ring 42, through the passage 36 and the tube 12 into the housing 18 and the spout 22. Water flowing through the holes 74 deflects the diaphragm 80 downwardly into engagement with the upper, circular edge of the spigot 64, closing the orifices 86 and, at the same time, the water pressure shifts the disc 76 downwardly away from the opening 82 such that the water is free to flow into the spigot 64.

FIG. 4 illustrates the positions of component parts if the water pressure into the tube 12 drops below the water pressure downstream of the spigot 64. In that event, the pressure acting on the disc 76 and the diaphragm 80 therebelow, aided by the spring 72, will clamp the diaphragm 80 between the plate 62 and the disc 76 precluding backflow into the housing 18 because of closing of the opening 82 as well as the central perforation and holes 74 in the plate 62. Opening of the orifices 86 admits air into the spigot 64 such that any water in the hose attached to the spigot 64 which can gravitate therefrom will escape via the orifices 86. Under no circumstances then will any backflow water reach and contaminate the water supply to the hydrant 10.

Hoses having shut-off nozzles which automatically close, as well as those which are manually closed, have common use in connection with water hydrants. It is not unusual for users to close the hydrants without opening the nozzles to drain the hoses. In that event (FIG. 1) there is still no danger of freezing in the hydrant 10 because of drainage through the spout 22 to the orifices 86, as above explained, because pressure in the hose is relieved by virtue of the provision of the orifices 86. Also, if the hose is located above the orifices 86, water will drain by gravity from the hose through the orifices 86.

In FIGS. 10, 12 and 13, the check valve 32 and all its component parts 62, 66, 68 and 78 remain unchanged. A spout 90 is provided with internal screw threads 92 in mesh with external screw threads 94 on a removable spigot 96, the threads 94 to be distinguished from hose threads 98 on spigot 94 provided the same as on the spigot 64 shown in FIGS. 1-4. An inner rim 100 on the spigot 94 clamps plate 102 and diaphragm 104 of check valve 106 against corresponding, continuous outwardly facing shoulders within the spout 90 adjacent the threads 92.

An upper, continuous, outer, radial flange 108 integral with the spigot 94 bears against an O-ring seal 110 surrounding the spigot 94 between the threads 92, 94 and the flange 108. A lower, continuous, outer, radial flange 112 integral with the spigot 94 is spaced below the flange 108, presenting a groove 114 surrounding the spigot 94. A circular series of holes 116 in the spigot 94, surrounding the central bore 118 of the spigot 94, extend downwardly from inside the rim 100 and communicate at their lower ends with the groove 114. The disc 120 and the head 122 of the valve 106 are free to move downwardly into the upper end of the bore 118.

In FIGS. 11 and 12 a water valve 124 at water inlet bore 126 and disposed within inner housing 128 has a water passage 130 and is screw threaded at 132 to the housing 128. The valve 124 has a plug 134 provided with a taper 136 surrounded by a seal 138 shown engaged with a continuous seat 140 integral with the housing 128. A pair of diametrically opposed slots 142 extend longitudinally of the valve 124 between the plug 134 and stem 144 to which the valve 124 is attached.

The operation of the hydrant as thus far described with respect to FIGS. 10–13 is essentially the same as the above description of the operation of the hydrant 10 shown in FIGS. 1–9 and need not be repeated.

However, in FIGS. 10, 12 and 13 there is also shown a cylindrical sleeve 146 rotatable on the spout 90 for directing drainage water away from the operator of the hand wheel 26 (FIGS. 1–4). The sleeve 146 is in sliding frictional engagement with the spigot 90 and limited in its upward movement by a continuous, integral, inturned flange 148 in underlying engagement with the lower flange 112. An elongated aperture 150 in the sleeve 146 registers with the groove 114. The sleeve 146 may be rotated to cause drainage water emanating from the aperture 150 to be discharged away from the operator such as to not splash in his direction.

We claim:

1. In a water hydrant having an elongated tube provided with an inner housing having a cylindrical water inlet bore, an outer housing having a cylindrical air inlet bore and a laterally extending water outlet spout disposed inwardly of the air inlet bore, a rotatable stem reciprocable in the tube and the outer housing, terminating in an exterior operating member, and a plurality of stem-actuated valves including:
   a water valve connected to the stem in the inner housing for controlling the flow of water from the water inlet bore to the tube;
   an air valve connected to the stem in the outer housing for controlling the inflow of air and precluding outflow of water through the air inlet bore; and
   a check valve in the spout for precluding backflow of water into the outer housing,
   said air valve having means for opening the check valve during operation of said member.

2. The invention of claim 1, said check valve being movable to an open position in response to water pressure from the outer housing to the spout.

3. The invention of claim 1, said spout having an orifice open to the atmosphere, said check valve blocking the orifice when the check valve is open.

4. The invention of claim 3, said check valve being movable to an open position in response to water pressure from the outer housing to the spout.

5. The invention of claim 3; a spigot carried by the spout having an annular groove registering with the orifice; and means on the spout for controlling flow of drainage water emanating from the groove in any one of a number of preselected directions.

6. The invention of claim 1, said check valve opening means including a cam on the air valve operable upon opening of the air valve.

7. The invention of claim 6, said check valve being movable, when the air valve is closed, to an open position in response to water pressure from the outer housing to the spout.

8. The invention of claim 7, said spout having an orifice open to the atmosphere, said check valve blocking the orifice when the check valve is open.

9. The invention of claim 8, said check valve opening the orifice in response to a decrease in pressure within the tube below the pressure downstream of the spout.

10. The invention of claim 1; and intermeshing screw threads between the water valve and the inner housing, said water valve having a water passage by-passing said threads.

11. The invention of claim 10, said water inlet bore terminating in a combination valve seat and stop within the inner housing, said water valve having a plug rotatable in the inner housing and shiftable into water tight engagement with said seat upon rotation of said member in one direction.

12. The invention of claim 11; and an annular seal carried by the plug in surrounding relationship thereto for movement into water tight relation to the water inlet bore therewithin when the plug is shifted into engagement with said seat.

13. The invention of claim 12, said seal being an O-ring disposed for wiping engagement with the inner housing when the same is moved into the water inlet bore, said seat being tapered and said plug having a surface between the O-ring and said passage mating with the seat and disposed for wiping engagement therewith after the O-ring is moved into the water inlet bore.

14. The invention of claim 10, said water inlet bore having a tapered seat therein, said water valve having a tapered plug in the inner housing provided with a seal around its taper engageable with the tapered seat.

15. The invention of claim 1; and a stem guide in the outer housing provided with an air inlet port communicating with said air inlet bore and disposed to limit the extent of movement of the air valve away from the water inlet bore.

16. The invention of claim 1, said air valve having an annular seal in surrounding relation thereto disposed for movement from a fluid flow clearance position to a fluid tight relation to the air inlet bore as said member is operated to open the water valve.

17. The invention of claim 16, said sealing being an O-ring disposed for wiping engagement with the outer housing while the same is moved along and within the air inlet bore.

18. The invention of claim 16, said check valve operating means including a cam on the air valve inwardly of said seal and operable upon opening of the air valve.

* * * * *